(12) United States Patent
Nishisaka et al.

(10) Patent No.: US 9,312,952 B2
(45) Date of Patent: Apr. 12, 2016

(54) TRANSMISSION DEVICE AND METHOD OF CONTROLLING TRANSMISSION DEVICE

(71) Applicant: FUJITSU LIMITED, Kawasaki-shi, Kanagawa (JP)

(72) Inventors: Kiyomasa Nishisaka, Sanda (JP); Takashi Kuwabara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/539,270

(22) Filed: Nov. 12, 2014

(65) Prior Publication Data
US 2015/0206407 A1 Jul. 23, 2015

(30) Foreign Application Priority Data

Jan. 21, 2014 (JP) .................................. 2014-009018

(51) Int. Cl.
- *G08B 23/00* (2006.01)
- *H04B 10/07* (2013.01)
- *G02B 6/42* (2006.01)
- *H04L 1/00* (2006.01)

(52) U.S. Cl.
CPC .............. *H04B 10/07* (2013.01); *G02B 6/4284* (2013.01); *G02B 6/4292* (2013.01); *H04L 1/0057* (2013.01)

(58) Field of Classification Search
CPC . H04L 1/0057; H04L 43/16; H04J 2203/006; G02B 6/4292; G02B 6/4284; H04B 10/40

USPC .................... 340/517; 398/128, 135, 138
See application file for complete search history.

(56) References Cited

U.S. PATENT DOCUMENTS

| 7,580,637 B2* | 8/2009 | El-Ahmadi et al. .......... 398/135 |
| 8,107,821 B2* | 1/2012 | El-Ahmadi et al. .......... 398/135 |
| 8,682,158 B2* | 3/2014 | Smith et al. ..................... 398/20 |
| 9,071,349 B2* | 6/2015 | El-Ahmadi et al. |
| 2002/0191242 A1* | 12/2002 | Sommer et al. ............... 359/158 |
| 2005/0147106 A1 | 7/2005 | Sonoda |

FOREIGN PATENT DOCUMENTS

| JP | 11-308219 | 11/1999 |
| JP | 2000-78153 | 3/2000 |
| JP | 2010-103780 | 5/2010 |
| WO | WO 2004/030250 A1 | 4/2004 |

* cited by examiner

*Primary Examiner* — John A Tweel, Jr.
(74) *Attorney, Agent, or Firm* — Staas & Halsey LLP

(57) ABSTRACT

A transmission device includes: a plurality of detectors configured to respectively detect alarms of a plurality of frame signals having divided client signals respectively; a memory configured to store group information indicating a group in which the client signal is in common regarding the plurality of frame signals; a specifying portion configured to specify, based on the group information, a second frame signal storing the client signal in common with a first frame signal in which a first alarm is detected by one of the plurality of detectors among the plurality of frame signals; and one or more generators configured to generate a second alarm for the second frame signal.

12 Claims, 14 Drawing Sheets

FIG. 4

| Column Row | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | FAS | | | | | | | SM | | | | | RES | | | | |
| 2 | RES | PM&TCM *4 | TCM ACT | TCM6 | | | MFAS | TCM5 | | | GCC0 | | | TCM4 | | | |
| | TTI | BIP-8 | *3 | TTI | BIP-8 | *3 | TTI | BIP-8 | *1 | TTI | BIP-8 | *3 | | FTFL | | | |
| 3 | TCM3 | | | TCM2 | | | TCM1 | | | PM | | | EXP | | | | |
| | TTI | BIP-8 | *3 | TTI | BIP-8 | *3 | TTI | BIP-8 | *3 | TTI | BIP-8 | *2 | | | | | |
| 4 | GCC1 | | GCC2 | | APS/PCC | | | | | RES | | | | PSI | RES | JC | NJO | PJO |

*1

| 1 | 2 | 3 | 4 | 5 | 6 | 7 | 8 |
|---|---|---|---|---|---|---|---|
| BEI/BIAE | | | | BDI | IAE | RES | |

*2

| 1 | 2 | 3 | 4 | 5 | 6 | 7 | 8 |
|---|---|---|---|---|---|---|---|
| BEI | | | | BDI | | STAT | |

*3

| 1 | 2 | 3 | 4 | 5 | 6 | 7 | 8 |
|---|---|---|---|---|---|---|---|
| BEI/BIAEi | | | | BDIi | STATi | | |

*4

| 1 | 2 | 3 | 4 | 5 | 6 | 7 | 8 |
|---|---|---|---|---|---|---|---|
| DMt1 | DMt2 | DMt3 | DMt4 | DMt5 | DMt6 | DMp | RES |

FIG. 6A

| | FORWARD INTERFACE UNIT | | | | | | | |
|---|---|---|---|---|---|---|---|---|
| | #1 | #2 | #3 | #4 | #5 | #6 | #7 | #8 |
| #1 | 0 | 0 | 0 | 0 | 1 | 1 | 1 | 1 |
| #2 | 0 | 0 | 0 | 0 | 1 | 1 | 1 | 1 |
| #3 | 0 | 0 | 0 | 0 | 1 | 1 | 1 | 1 |
| #4 | 0 | 0 | 0 | 0 | 1 | 1 | 1 | 1 |
| #5 | 1 | 1 | 1 | 1 | 0 | 0 | 0 | 0 |
| #6 | 1 | 1 | 1 | 1 | 0 | 0 | 0 | 0 |
| #7 | 1 | 1 | 1 | 1 | 0 | 0 | 0 | 0 |
| #8 | 1 | 1 | 1 | 1 | 0 | 0 | 0 | 0 |

| | BACKWARD INTERFACE UNIT | | | | | | | |
|---|---|---|---|---|---|---|---|---|
| | #1 | #2 | #3 | #4 | #5 | #6 | #7 | #8 |
| #1 | 1 | 1 | 1 | 1 | 0 | 0 | 0 | 0 |
| #2 | 1 | 1 | 1 | 1 | 0 | 0 | 0 | 0 |
| #3 | 1 | 1 | 1 | 1 | 0 | 0 | 0 | 0 |
| #4 | 1 | 1 | 1 | 1 | 0 | 0 | 0 | 0 |
| #5 | 0 | 0 | 0 | 0 | 1 | 1 | 1 | 1 |
| #6 | 0 | 0 | 0 | 0 | 1 | 1 | 1 | 1 |
| #7 | 0 | 0 | 0 | 0 | 1 | 1 | 1 | 1 |
| #8 | 0 | 0 | 0 | 0 | 1 | 1 | 1 | 1 |

| | FORWARD INTERFACE UNIT | | | | | |
|---|---|---|---|---|---|---|
| | #1 | #2 | #3 | #4 | #5 | #6 |
| #1 | 0 | 0 | 0 | 0 | 1 | 1 |
| #2 | 0 | 0 | 0 | 0 | 1 | 1 |
| #3 | 0 | 0 | 0 | 0 | 1 | 1 |
| #4 | 0 | 0 | 0 | 0 | 1 | 1 |
| #5 | 1 | 1 | 1 | 1 | 0 | 0 |
| #6 | 1 | 1 | 1 | 1 | 0 | 0 |

FIG. 11B

| | BACKWARD INTERFACE UNIT | | | | | |
|---|---|---|---|---|---|---|
| | #1 | #2 | #3 | #4 | #5 | #6 |
| #1 | 1 | 1 | 1 | 1 | 0 | 0 |
| #2 | 1 | 1 | 1 | 1 | 0 | 0 |
| #3 | 1 | 1 | 1 | 1 | 0 | 0 |
| #4 | 1 | 1 | 1 | 1 | 0 | 0 |
| #5 | 0 | 0 | 0 | 0 | 1 | 1 |
| #6 | 0 | 0 | 0 | 0 | 1 | 1 |

TRANSMISSION DEVICE AND METHOD OF CONTROLLING TRANSMISSION DEVICE

CROSS-REFERENCE TO RELATED APPLICATION

This application is based upon and claims the benefit of priority of the prior Japanese Patent Application No. 2014-009018, filed on Jan. 21, 2014, the entire contents of which are incorporated herein by reference.

FIELD

The embodiments discussed herein are related to a transmission device and a method of controlling a transmission device.

BACKGROUND

As communication demands increase, high speed optical transport systems are standardized. For example, the International Telecommunication Union Telecommunication Standardization Sector (ITU-T) Recommendation G.709 defines a technique of optical transport network (OTN) of approximately from 1.25 to 100 Gbps.

Related techniques are disclosed in Japanese Laid-open Patent Publication No. 11-308219 or Japanese Laid-open Patent Publication No. 2000-78153.

SUMMARY

According to an aspect of the embodiments, a transmission device includes: a plurality of detectors configured to respectively detect alarms of a plurality of frame signals having divided client signals respectively; a memory configured to store group information indicating a group in which the client signal is in common regarding the plurality of frame signals; a specifying portion configured to specify, based on the group information, a second frame signal storing the client signal in common with a first frame signal in which a first alarm is detected by one of the plurality of detectors among the plurality of frame signals; and one or more generators configured to generate a second alarm for the second frame signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates one example of an overhead of an OTU frame;

FIG. 6A illustrates one example of a forward table;

FIG. 6B illustrates one example of a backward table;

FIG. 11A illustrates one example of a forward table;

FIG. 11B illustrates one example of a backward table;

DESCRIPTION OF EMBODIMENTS

Figure 1:
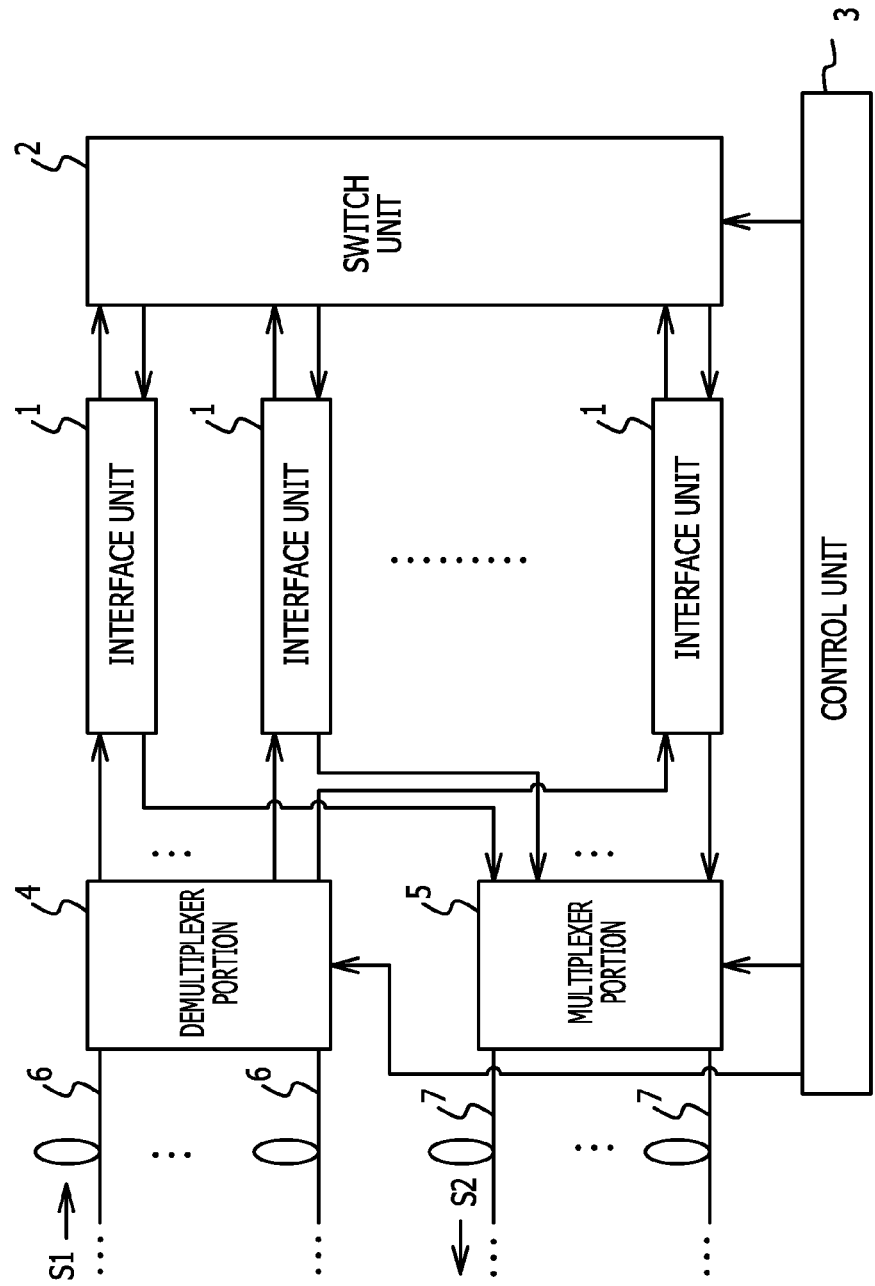
FIG. 1 illustrates one example of functional configuration of a transmission device.

Optical transmission in an OTN is carried out by storing a plurality of client signals in an optical signal in a format called as an optical channel transport unit (OTU) frame to carry out high capacity transmission. A client signal to be stored in an OTU frame may include a synchronous digital hierarchy (SDH) frame, a synchronous optical network (SONET) frame, and an Ethernet® frame. Therefore, the OTN technique is used as a high capacity transmission mechanism in a core network.

An OTU frame has one or more optical channel data units (ODUs) to flexibly store client signals at various transmission rates by mapping. An ODU has a plurality of transmission rates. For example, ITU-T Recommendation G.709 defines "ODU0" for 1.25 Gbps, "ODU1" for 5 Gbps, "ODU2" for 10 Gbps, "ODU3" for 40 Gbps, "ODU4" for 100 Gbps, and the like.

For example, a client signal at a transmission rate up to 100 Gbps (such as 100GBASE-R) is transmitted in the time division multiplexing system.

In order to carry out high capacity transmission, such as 400 Gbps and 1 Tbps, a highly multileveled modulation system, such as dual polarization (DP)—64 quadrature amplitude modulation (QAM), may be applied. When a multilevel modulation mechanism is applied to optical communication, the signal noise (SN) ratio decreases, so that the transmission range may be reduced.

In order to improve the SN ratio for long distance transmission, a multilevel modulation signal is taken as a subcarrier signal and a plurality of subcarrier signals are bundled by a wavelength multiplexing technique for transmission. A multicarrier signal obtained by bundling a plurality of subcarrier signals may be referred to as a "super-channel" and the like. A highly multileveled modulation system may also include, not only DP-64QAM, DP-QPSK (quaternary phase-shift keying) and DP-BPSK (binary phase-shift keying).

In a case of the OTN, a technique of ODU4Cn (bit rate: 100×n (Gbps) (n: natural number)) divides, for example, a client signal of more than 100 Gbps into a plurality of ODU4s having different wavelengths for storage to transmit in a super channel. For example, a client signal at a transmission rate of 400 Gbps (for example, 400GE) is stored in an OTN frame for transmission.

In such multicarrier transmission, the wavelength is different for each subcarrier signal and the spectrum at each wavelength is located in a narrow band to increase the transmission capacity. Therefore, in the multicarrier transmission, instead of a fixed bandwidth (for example, 50 GHz, 100 GHz, and the like), a flexible grid function that allows a variable bandwidth (such as 75 GHz and 137.5 GHz) is used. The flexible grid function is also called as a gridless function and defined in ITU-T Recommendation G.694.1.

In the transmission technique of ODU4Cn, one client signal (one frame signal) is processed for each ODU4 (plurality of subframes). Therefore, a transmission device processes the plurality of ODU4s in parallel using a plurality of lanes and carries out alarm detection and the like for each ODU4. For example, in a case of ODU4Cn at 100 Gbps, signal processing at 100 Gbps is carried out in each of the four lanes.

Regarding alarm detection processing, connection configuration where, for example, signals of different lines do not go through a circuit element in common is employed to search a table indicating connection relationship of a circuit element with a slot and a port, thereby specifying a defect area. In addition, for example, based on a table indicating a group path that a plurality of virtual paths belong to, channel switching when a defect occurs is carried out.

For example, since a plurality of ODU4s store one client signal as a whole, it may not be preferred to handle an alarm individually for each ODU4 for the operation, administration and maintenance (OAM) functions. When an alarm occurs in at least one of the plurality of ODU4s, the alarm may be detected as an alarm of the client signal, for example, an alarm of one communication line. Not limited to ODU4Cn, similar handling may be performed in other multicarrier transmission systems.

FIG. 1 illustrates one example of functional configuration of a transmission device. The transmission device is installed in, for example, a backbone network to transmit a plurality of optical signals (subcarrier signals) having different wavelengths based on a multicarrier transmission system.

The plurality of optical signals are multiplexed by the flexible grid function to be transmitted as a wavelength multiplexed optical signal (hereinafter, referred to as a "multiplexed optical signal"). The transmission device is not limited to the multicarrier transmission system and a plurality of optical signals may also be transmitted respectively via a plurality of transmission channels without wavelength multiplexing.

The transmission device has a plurality of interface units 1, a switch unit 2, a control unit 3, a demultiplexer portion 4, and a multiplexer portion 5. The respective units 1 through 3, the demultiplexer portion 4, and the multiplexer portion 5 may be, for example, an electronic circuit board having electronic components, optical components, and the like mounted thereon and are stored respectively in a plurality of slots equipped in a housing of the transmission device. The respective units 1 through 3, the demultiplexer portion 4, and the multiplexer portion 5 are electrically coupled with each other via a wiring board equipped on a backside of the housing of the transmission device.

The demultiplexer portion 4 is coupled with one or more optical fibers (transmission channels) 6 and demultiplexes a multiplexed optical signal S1 input from each optical fiber 6 for each wavelength to output a plurality of optical signals obtained by demultiplexing respectively to the plurality of interface units 1. As the demultiplexer portion 4, a wavelength selective switch may be used, for example. In this case, the demultiplexer portion 4 leads an optical signal at each wavelength to the respective interface unit 1 in accordance with wavelength setting carried out by the control unit 3.

The plurality of interface units 1 receive optical signals input from the demultiplexer portion 4 to output to the switch unit 2. The switch unit 2 outputs the optical signals inputted from the interface units 1 to other interface units 1 in accordance with the destinations following the switch setting by the control unit 3. The interface units 1 carry out transmitting process of the optical signals input from the switch unit 2 to output the optical signals to the multiplexer portion 5.

The multiplexer portion 5 is coupled with one or more optical fibers (transmission channels) 7 and multiplexes the plurality of optical signals input respectively from the plurality of interface units 1 to output to the optical fibers 7 as a multiplexed optical signal S2. As the multiplexer portion 5, an optical coupler or a wavelength selective switch may be used, for example. In a case of a wavelength selective switch, the multiplexer portion 5 multiplexes the optical signals at the respective wavelength in accordance with the wavelength setting carried out by the control unit 3 to lead to the respective interface units 1.

The control unit 3 carries out monitoring control of the entire transmission device and carries out, for example, switch setting of the switch unit 2 and wavelength setting of the demultiplexer portion 4 and the multiplexer portion 5. The control unit 3 may be provided with a processor, such as a central processing unit (CPU), for example, and driven by software.

Figure 2:
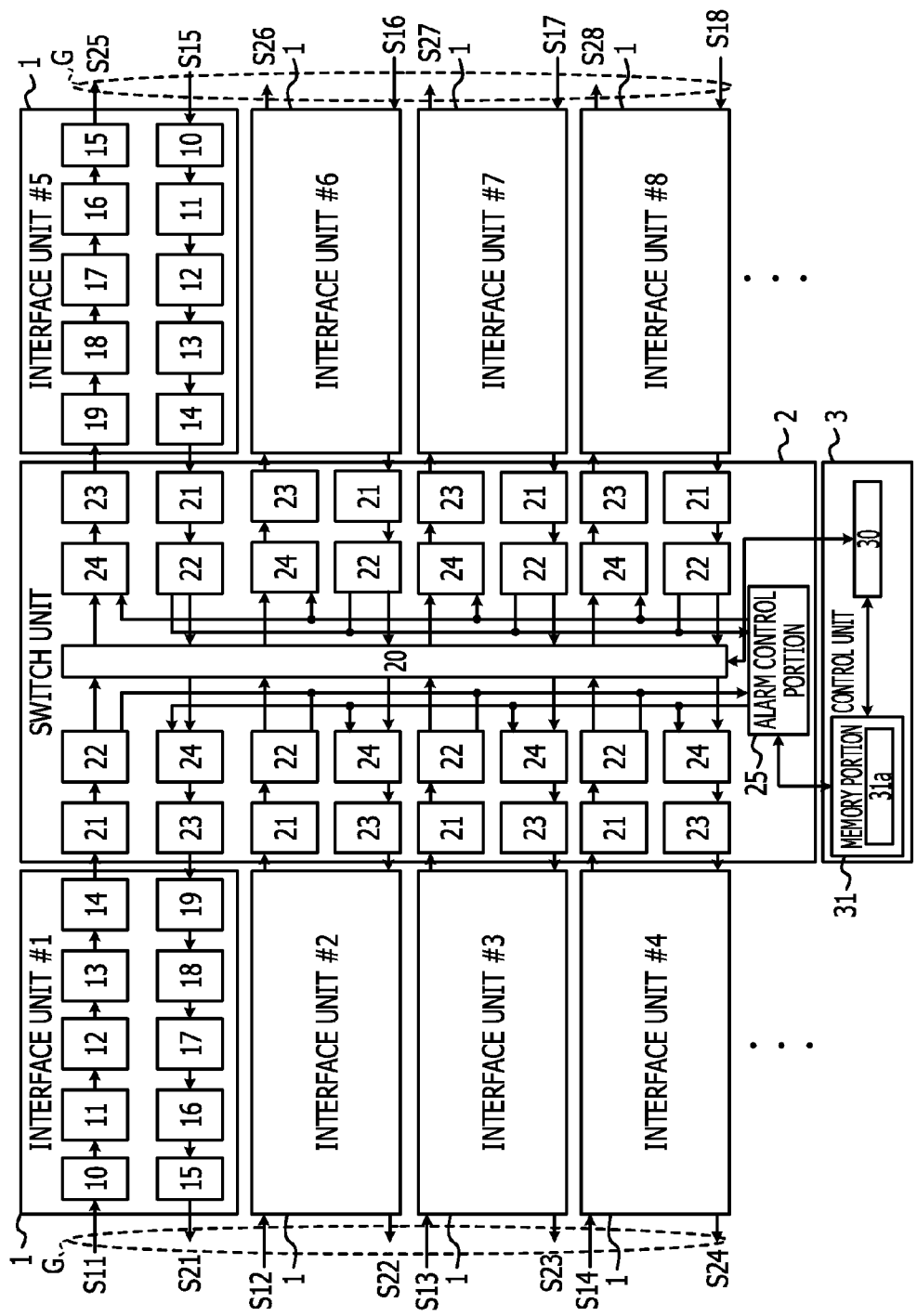
FIG. 2 illustrates one example of functional configuration of an interface unit and a switch unit.

FIG. 2 illustrates one example of functional configuration of an interface unit and a switch unit. FIG. 2 illustrates, as one example, an implementation state of the interface units 1 of identification numbers (identifiers) #1 through #8 ("interface unit #1" through "interface unit #8").

The identification numbers of the interface units 1 may be, for example, inherent numbers of the interface units 1 (for example, serial numbers) and may also be numbers of the slots to which the interface units 1 are implemented in the housing of the transmission device. In the following descriptions, the interface units 1 of the identification numbers #1 through #8 are expressed as "interface unit (#1)" through "interface unit (#8)" to be distinguished from each other.

To the interface units (#1 through #4) 1, optical signals (frame signals) S11 through S14 having different wavelengths are respectively input from the demultiplexer portion 4. The optical signals S11 through S14 are obtained by demultiplexing of the multiplexed optical signal S1 in common by the demultiplexer portion 4.

The optical signals S11 through S14 are formed respectively by, for example, OTU frames of 100 Gbps (ODU4s) to divide the client signal in common for storage. For example, the OTU frames of the optical signals S11 through S14 store data obtained respectively by dividing the client signal in common into four. The client signal may include, for example, a SDH frame, a SONET frame, an Ethernet® frame, and the like.

Therefore, the optical signals S11 through S14 are managed as a group G having the stored client signal in common. Similar to this, the interface units (#1 through #4) 1 processing the optical signals S11 through S14 are also managed as the group G. The management of the group G may be carried out by the control unit 3 based on the identification numbers #1 through #8 of the respective interface units 1.

After being input from the interface units (#1 through #4) 1 via the switch unit 2 to the interface units (#5 through #8) 1 respectively, the optical signals S11 through S14 are transmitted to another transmission device as optical signals S25 through S28. The optical signals S25 through S28 are multiplexed to the multiplexed optical signal S2 in common in the multiplexer portion 5.

The optical signals S25 through S28 are managed as the group G having the stored client signal in common together with the interface units (#5 through #8) 1. Optical signals S15 through S18 input to the interface units (#5 through #8) 1 and optical signals S21 through S24 output from the interface units (#1 through #4) 1 are also managed as the group G, similarly.

Each interface units 1 has a transmission processing rate of, for example, 100 Gbps and carries out modulation process and demodulation process based on DP-BPSK. Accordingly, the four interface units (#1 through #4, #5 through #8) 1 that belong to the identical group G, as a whole, transmit a client signal of 400 Gbps. For example, the transmission device performs transmission process by dividing a client signal of 400 Gbps into four logical lanes (physical lanes).

The interface unit 1 includes a receiving portion 10, an overhead (OH) extracting portion 11, an alarm detecting portion (detecting portion) 12, an ODU generation portion 13, and an output converting portion 14. The interface unit 1 has a transmitting portion 15, an overhead (OH) insertion portion 16, an alarm forwarding portion (forwarding process portion) 17, an OTU generation portion 18, and an input converting portion 19. Although FIG. 2 illustrates configuration of the interface units (#1, #5) 1, the other interface units (#2 through #4, #6 through #8) 1 may also have substantially the same or similar configuration.

The receiving portion 10 carries out receiving process of optical signals S11 through S18. The receiving portion 10 converts the optical signals S11 through S18 to an electrical signal (optical/electrical conversion) to carry out demodulation process, frame synchronization process, serial-parallel conversion process (SerDes function), and the like of the electrical signal. The demodulation process may be carried out in accordance with the modulation system of the optical signals S11 through S18. For example, as the modulation system, DP-BPSK may be used. The electrical signal output from the receiving portion 10 is expressed as an "OTU frame" or a "frame signal" in the following descriptions.

Figure 3:
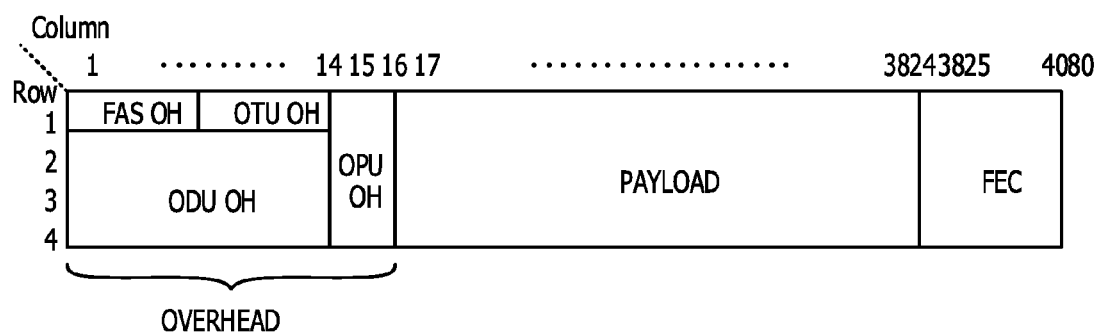
FIG. 3 illustrates one example of an OTU frame.

The OH extracting portion 11 extracts certain control information and the like from an overhead of an OTU frame. FIG. 3 illustrates one example of an OTU frame. An OTU frame has three regions to contain overheads, payload, and forward error correction (FEC), respectively. As a format of the optical signals S11 through S18, the OTU frame defined in ITU-T Recommendation G.709 may be employed and a frame in another format may also be employed. The "OH" in FIG. 3 indicates an overhead.

The overhead region includes a frame alignment signal (FAS) overhead, an OTU overhead, an ODU overhead, and an optical channel payload unit (OPU) overhead. Each overhead includes various types of control information. The payload region is equipped with one or more tributary slots (TSs), which is a logical channel, to store a client signal for each TS.

FIG. 4 illustrates one example of an overhead of an OTU. In FIG. 4, a "Row" and a "Column" may correspond respectively to the "Row" and the "Column" in FIG. 3. The contents of "*1" through "*4" in the frame are illustrated respectively in "*1" through "*4" outside the frame.

The FAS overhead includes FAS and a multi-frame alignment signal (MFAS) and is used for frame synchronization process in the receiving portion 10. Therefore, the FAS overhead has unique pattern data indicating the beginning of the OTU frame.

The OTU overhead provides a monitoring function and includes section monitoring (SM), a general communication channel (GCC) 0, and reserved for future international standardization (RES). The SM includes a trail trace identifier (TTI) and bit interleaved parity level 8 (BIP-8). The SM further includes backward error indication (BEI)/backward incoming alignment error (BIAE), backward defect indication (BDI), an incoming alignment error (IAE), and RES.

The ODU overhead includes RES, path monitoring (PM) & tandem connection monitoring (TCM), TCM activation/ deactivation control channel (ACT), TCMs 1 through 6, and a fault type & fault location reporting channel (FTFL). The ODU overhead further includes PM, experimental (EXP), GCCs1, 2, and automatic protection switching coordination channel (APS)/protection communication channel (PCC). The PM & TCM includes delay measurement of TCM (DMt) 1 through 6, delay measurement of ODUk path (DMp), and RES.

The TCMs 1 through 6 respectively include a TTI, BIP-8, BEIi/BIAEi, BDIi, and status (STAT) i (i=1 through 6). The PM includes a TTI, BIP-8, BEI, BDI, and STAT.

The OPU overhead includes a payload structure identifier (PSI), justification control (JC), negative justification opportunity (NJO), positive justification opportunity (PJO), and RES. The RES is used as the JC in a case of a generic mapping procedure (GMP) operation. As each of the above parameters, the parameters defined in ITU-T Recommendation G.709 may also be used.

With reference to FIG. 2, the alarm detecting portion 12 detects an alarm of a frame signal having a divided client signal stored therein. For example, the alarm detecting portion 12 detects an alarm of a frame signal based on the control information extracted by the OH extracting portion 11. For example, the alarm detecting portion 12 detects an alarm (synchronization defect) when the receiving portion 10 fails to establish synchronization based on the FAS overhead.

As the control information used for the alarm detection processing, in a case of aAIS, taking ODUkT_TT_Sk as one example, the TCMs 1 through 6 and the PM in the overhead in FIG. 4 may be used, and in a case of aBDI, taking ODUkT_TT_Sk as one example, the SM, the TCMs 1 through 6, the PM, the FAS, and the MFAS in the overheads may be used. For example, the STATi (a dAIS (alarm indication signal), dOCI (open connection indication), dLTC (loss of tandem connection), dLCT (locked defect), and the like) and the TTI (dTIM (trail trace identifier mismatch)) in the TCMs 1 through 6 are used. For the PM, the FAS, and the MFAS, an alarm of a lower layer (for the FAS and the MFAS, dLOS (loss of signal), dLOF (loss of frame), dLOM (loss of multiframe), and the like) is used.

The alarm detecting portion 12 is equipped for each interface unit 1. The alarms of the respective frame signals obtained from the optical signals S11 through S18 are detected individually by the plurality of alarm detecting portions 12. The alarm detecting portion 12 outputs the detected alarm to the output converting portion 14. The alarm detecting portion 12 outputs the frame signal to the ODU generation portion 13.

The ODU generation portion 13 converts the format of the frame signal from the OTU frames to an ODU frame. For example, the ODU generation portion 13 deletes the FAS overhead and the OTU overhead from the OTU frames. The ODU generation portion 13 outputs the ODU frame obtained by the conversion process to the output converting portion 14.

Figure 5:
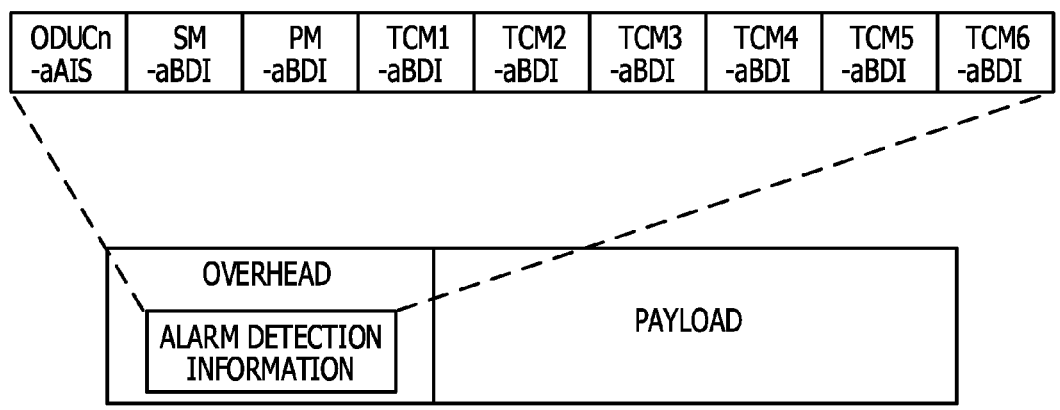
FIG. 5 illustrates one example of an intra-device frame.

The output converting portion 14 converts the ODU frame to a certain intra-device frame. FIG. 5 illustrates one example of an intra-device frame. The intra-device frame includes an overhead and a payload. The payload includes a payload of the ODU frame.

The overhead includes, for example, control information and alarm detection information in the ODU overhead. The alarm detection information is generated based on the alarm input from the alarm detecting portion 12 to be inserted into the overhead. The alarm detection information may include an alarm to be a factor of the AIS sent to another transmission device equipped on a downstream side of the transmission device and an alarm to be a factor of BDI sent to another transmission device equipped on an upstream side of the transmission device.

The alarm detection information may include, for example, ODUCn-aAIS, SM-aBDI, PM-aBDI, and TCM1-aBDI through TCM6-aBDI. It is indicated that the alarm is detected when the ODUCn-aAIS, the SM-aBDI, the PM-aBDI, and the TCM1-aBDI through TCM6-aBDI are "1", and it is indicated that the alarm is not detected when "0".

The ODUCn-aAIS is detected based on the TCMs 1 through 6 (STATi and TTI) and the PM (alarm of lower layer) in the overhead in FIG. 4 taking ODUkT_TT_Sk as one example. The SM-aBDI and PM-aBDI are detected respectively based on the SM (TTI) and the PM (alarm of lower layer, STATi, and TTI) in the overhead illustrated in FIG. 4 taking ODUkT_TT_Sk as one example. The TCM1-aBDI through TCM6-aBDI are detected respectively based on the TCMs 1 through 6 (STATi and TTI) in the overhead illustrated in FIG. 4 taking ODUkT_TT_Sk as one example. The generation of the aAIS and the aBDI may be carried out based on, for example, the generation system described in ITU-T Recommendation G.798.

With reference to FIG. 2, the output converting portion 14 outputs the intra-device frame obtained by the conversion process to the switch unit 2.

The switch unit 2 has a switch portion (SW) 20, a plurality of input converting portions 21, a plurality of alarm output portions 22, a plurality of output converting portions 23, a plurality of alarm generation portions (generation portions) 24, and an alarm control portion (specifying portion) 25. The input converting portions 21, the alarm output portions 22, the output converting portions 23, and the alarm generation portions 24 are equipped corresponding to each interface unit 1. The input converting portions 21, the alarm output portions 22, the output converting portions 23, and the alarm generation portions 24 may be equipped in a number the same as the interface units 1 available for implementation to the transmission device.

The intra-device frame output from the output converting portion 14 of the interface unit 1 is input to the input converting portion 21. The input converting portion 21 extracts alarm detection information from the overhead of the intra-device frame to output to the alarm output portion 22. The input converting portion 21 converts the intra-device frame to an ODU frame to output to the alarm output portion 22.

The alarm output portion 22 outputs the alarm detection information to the alarm control portion 25. The alarm output portion 22 outputs the ODU frame to the switch portion 20.

The switch portion 20 carries out switching control in such a manner that the ODU frame input from the alarm output portion 22 is outputted to the interface unit 1 in accordance with the destination following the switch setting from the control unit 3. For example, the switch portion 20 outputs the ODU frame to the alarm generation portion 24 corresponding to the interface unit 1. When destination information is given to the ODU frame, the switch portion 20 performs an output to the alarm generation portion 24 in accordance with the destination information instead of the above system.

The alarm control portion 25 specifies another frame signal to store the client signal in common with the frame signal in which an alarm is detected by the alarm detecting portion 12 among a plurality of frame signals based on group information 31a held by the control unit 3. For example, the alarm control portion 25 specifies the interface unit 1 to forward an alarm of each frame signal that belongs to the identical group G from the identification numbers of the interface units 1 of the frame signals (optical signals S11 through S14, S15 through S18) in which an alarm is detected. The alarm control portion 25 designates generation of an alarm to the alarm generation portion 24 corresponding to the specified interface unit 1.

The alarm generation portion 24 generates the alarm designated by the alarm control portion 25. For example, the alarm generation portion 24 generates alarm detection information (refer to FIG. 5) to be inserted into the overhead of the intra-device frame. At this time, the alarm in the alarm detection information (detected alarm) indicates "1" and another alarm (undetected alarm) indicates "0". The alarm generation portion 24 outputs the generated alarm detection information to the output converting portion 23. The alarm generation portion 24 outputs the ODU frame input from the switch portion 20 to the output converting portion 23. When there is no designation from the alarm control portion 25, the alarm generation portion 24 outputs alarm detection information in which all alarms are "0" (undetected) to the output converting portion 23.

The output converting portion 23 converts the ODU frame to an intra-device frame. The output converting portion 23 inserts the alarm detection information input from the alarm generation portion 24 into the overhead of the intra-device frame. The output converting portion 23 outputs the intra-device frame obtained by the conversion process to the input converting portion 19 of the interface unit 1.

The input converting portion 19 extracts the alarm detection information from the overhead of the intra-device frame to output to the OH insertion portion 16. The input converting portion 19 converts the intra-device frame to an ODU frame to output to the OTU generation portion 18.

The OTU generation portion 18 converts the ODU frame to an OTU frame. For example, the OTU generation portion 18 gives an FAS overhead to the ODU frame (refer to FIG. 3). The OTU generation portion 18 outputs the OTU frame obtained by the conversion process to the alarm forwarding portion 17.

The alarm forwarding portion 17 forwards the alarm detected by the alarm detecting portion 12 and the alarm generated by the alarm generation portion 24 to another transmission device. In the entire network, detection information of an alarm of the transmission device is shared.

For example, when an alarm to be a factor of AIS is detected (when ODUCn-aAIS="1" in FIG. 5), the alarm forwarding portion 17 outputs an instruction of generating AIS to the OH insertion portion 16. The AIS is transmitted in a forward direction (downstream direction), for example, to another transmission to which the optical signals S11 through S18 are transmitted. For example, when an alarm to be a factor of AIS is detected in any of the optical signals S11 through S14, the alarm is forwarded by that the AIS is transmitted from the interface units (#5 through #8) 1 to the transmission device of the connection destination.

When an alarm to be a factor of BDI is detected (for example, SM-aBDI="1" in FIG. 5), the alarm forwarding portion 17 outputs an instruction of generating BDI to the OH insertion portion 16. The BDI is transmitted in a backward direction (upstream direction), for example, to another transmission device to be the source of transmitting of the optical signals S11 through S18. For example, when an alarm to be a factor of BDI is detected in any of the optical signals S11 through S14, the alarm is forwarded by that the BDI is transmitted from the interface units (#1 through #4) 1 to the transmission device of the connection destination.

The OH insertion portion 16 inserts certain control information into the overhead of the OTU frame. When the instruction of generating AIS is input from the alarm forwarding portion 17, the OH insertion portion 16 generates AIS to output to the transmitting portion 15. The AIS (ODUk-AIS) may be a signal having the entire ODU overhead region other than the FTFL and the entire payload region which are made "1" (binary number) among the OTU frames.

When the instruction of generating BDI is input from the alarm forwarding portion 17, the OH insertion portion 16 inserts the BDI into the overhead of the OTU frame to output to the transmitting portion 15. For example, the OH insertion portion 16 makes the "BDI" or "BDIi" illustrated in FIG. 4 "1" (binary number) in accordance with the type of alarm to be a factor of BDI. For example, the OH insertion portion 16 makes the "BDI" in the "SM" "1" in a case of SM-aBDI. The type of alarm may be included in the instruction of generating BDI.

The transmitting portion 15 carries out transmitting process of the OTU frame. For example, the transmitting portion 15 carries out parallel-serial conversion process (SerDes function) and modulation process of the OTU frame to convert the OTU frame from an electrical signal to the optical signals S21 through S28 (electrical/optical conversion process). The modulation system of the transmitting portion 15 may be DP-BPSK.

The control unit 3 has a setting processing portion 30 and a memory portion 31. The setting processing portion 30 may be, for example, a CPU and the memory portion 31 may be, for example, a memory mechanism, such as a non-volatile memory and a hard disk drive.

The setting processing portion 30 and the memory portion 31 are coupled with the switch unit 2 via an intra-device bus. The setting processing portion 30 carries out switch setting of the switch portion 20 in accordance with, for example, designation from a network management device.

The memory portion 31 stores the group information 31a. The group information 31a may be, for example, one of provisioning settings (initial setting information of the transmission device before operation) of the interface unit 1 and is set from the setting processing portion 30 in accordance with a user operation.

The group information 31a indicates the group G having a client signal stored therein in common regarding the plurality of frame signals (optical signals S11 through S14, S15 through S18). The group information 31a includes two tables in accordance with a forwarding direction of the alarm, for example, a forward direction and a backward direction. In the following descriptions, the table in the forward direction is expressed as a "forward table" and the table in the backward direction is expressed as a "backward table".

FIG. 6A illustrates one example of a forward table. FIG. 6B illustrates one example of a backward table.

The forward table indicates correspondence relationship between the identification numbers of the interface units 1 in which an alarm is detected and the identification numbers of the interface units 1 to forward the alarm in the forward direction by the AIS (forward interface units). For example, in the row of the identification number of the interface unit 1 in which an alarm is detected, the forward interface unit 1 in the column indicating "1" transmits AIS and the forward interface unit 1 in the column indicating "0" does not transmit AIS. For example, when the interface unit (#1) 1 detects an alarm, the interface units (#5 through #8) 1 transmit AIS (refer to reference characters P1).

The backward table indicates correspondence relationship between the identification numbers of the interface units 1 in which an alarm is detected and the identification numbers of the interface units 1 to forward the alarm in the backward direction by BDI (backward interface units). For example, in the row of the identification number of the interface unit 1 in which an alarm is detected, the backward interface unit 1 in the column indicating "1" transmits BDI and the backward interface unit 1 in the column indicating "0" does not transmit BDI. For example, when the interface unit (#1) 1 detects an alarm, the interface units (#1 through #4) 1 transmit BDI (refer to reference characters P2).

In such a manner, the group information 31a indicates the group G of the interface units 1, for example, the group G of the frame signals (optical signals S11 through S18, S21 through S28). For example, the group information 31a indicates the alarm forwarding portion 17 to forward an alarm of each frame signal that belongs to the group G of the frame signal in which the alarm is detected among the plurality of frame signals. The alarm control portion 25 instructs generation of an alarm to the one or more alarm generation portions 24 in accordance with the alarm forwarding portion 17 indicated by the group information 31a.

The forwarding process of an alarm per group G may be carried out easily without being provided with complex hardware configuration, such as being equipped with wiring for control signals between all interface units 1. Since the interface unit 1 to carry out the forwarding process of the alarm is searched easily from the group information 31a, the time taken for the forwarding process may be reduced. For example, there is a case that AIS is requested to be forwarded within 2 frames after detection of the alarm to be the factor.

The alarm control portion 25 may refer to the group information 31a stored in the memory portion 31 in the control unit 3. For example, the switch unit 2 may also hold the group information 31a obtained from the memory portion 31 in a memory portion (such as a memory) in the switch unit 2 for reference.

Figure 7:
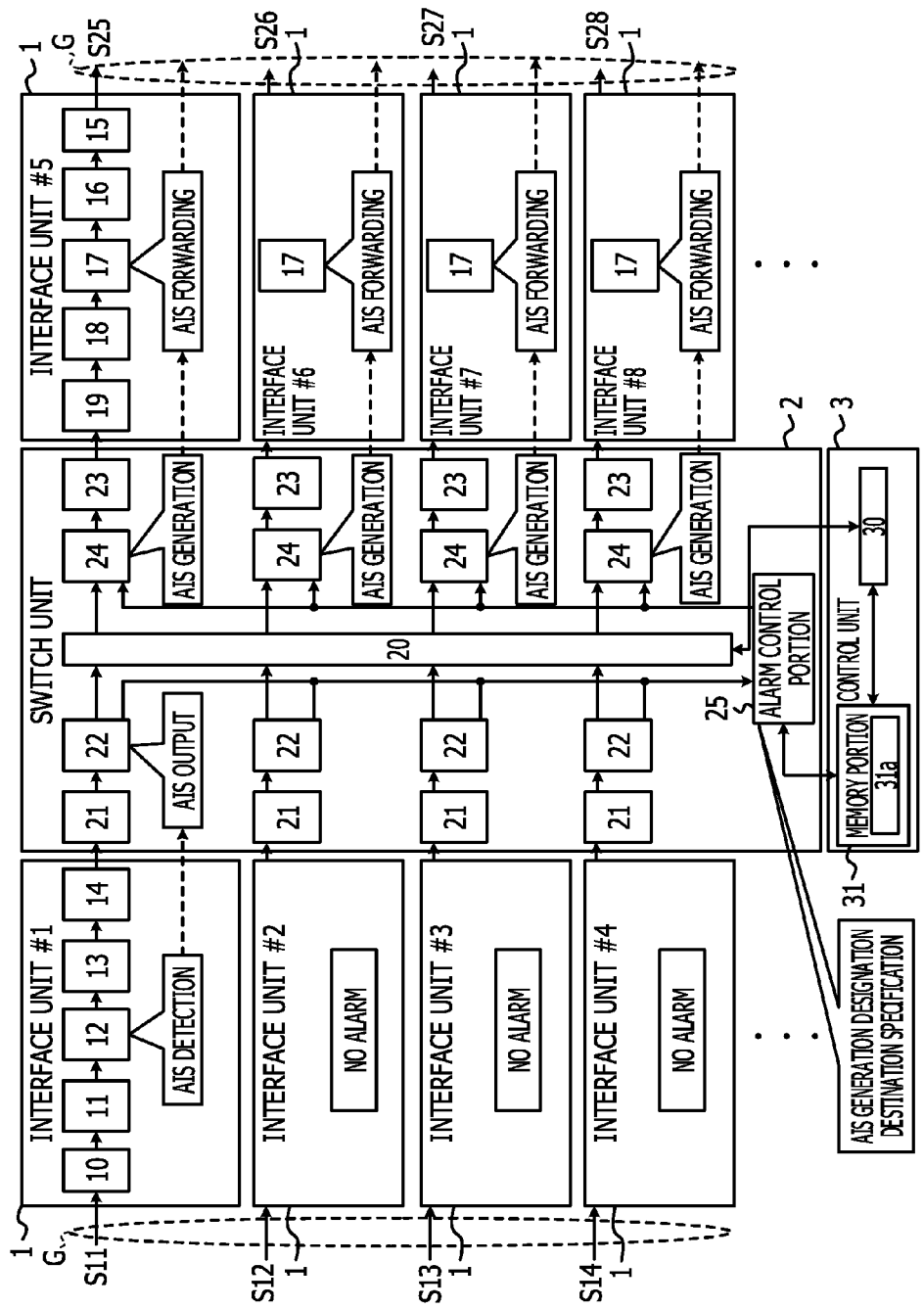
FIG. 7 illustrates one example of a first behavior of a transmission device.

FIG. 7 illustrates one example of a first behavior of a transmission device. In FIG. 7, identical reference characters are given to substantially the same or similar configuration to FIG. 2 and the descriptions may be omitted or reduced.

The alarm detecting portion 12 of the interface unit (#1) 1 detects an alarm to be a factor of AIS (refer to "AIS detection"). At this time, in the other interface units (#2 through #4) 1 in the identical group G, no alarm is detected (refer to "no alarm"). The detected alarm is notified to the alarm output portion 22 corresponding to the interface unit (#1) 1 by the alarm detection information (refer to broken lines). The alarm output portion 22 outputs the alarm detection information indicating occurrence of an alarm to the alarm control portion 25 (refer to "AIS output").

The alarm control portion 25 specifies the alarm generation portion 24 to be instructed to generate an alarm from the identification number #1 of the interface unit 1 in which the alarm is detected by referring to the group information 31a (refer to "AIS generation designation destination specification"). Since the alarm generation portions 24 corresponding to the interface units (#5 through #8) 1 become targets (refer to reference characters P1 in FIG. 6A), the alarm control portion 25 instructs each of the alarm generation portions 24 to generate the alarm.

The alarm generation portions 24 corresponding to the interface units (#5 through #8) 1 generate an alarm (refer to "AIS generation"). For example, the alarm generation portions 24 generate alarm detection information that notifies of detection of an alarm. The generated alarm detection information is output to the alarm forwarding portion 17 of the interface units (#5 through #8) 1 (refer to broken lines). The alarm forwarding portion 17 carries out forwarding process of the alarm, for example, generation process of AIS (refer to "AIS forwarding"). The AIS is transmitted to another transmission device in the forward direction.

Figure 8:
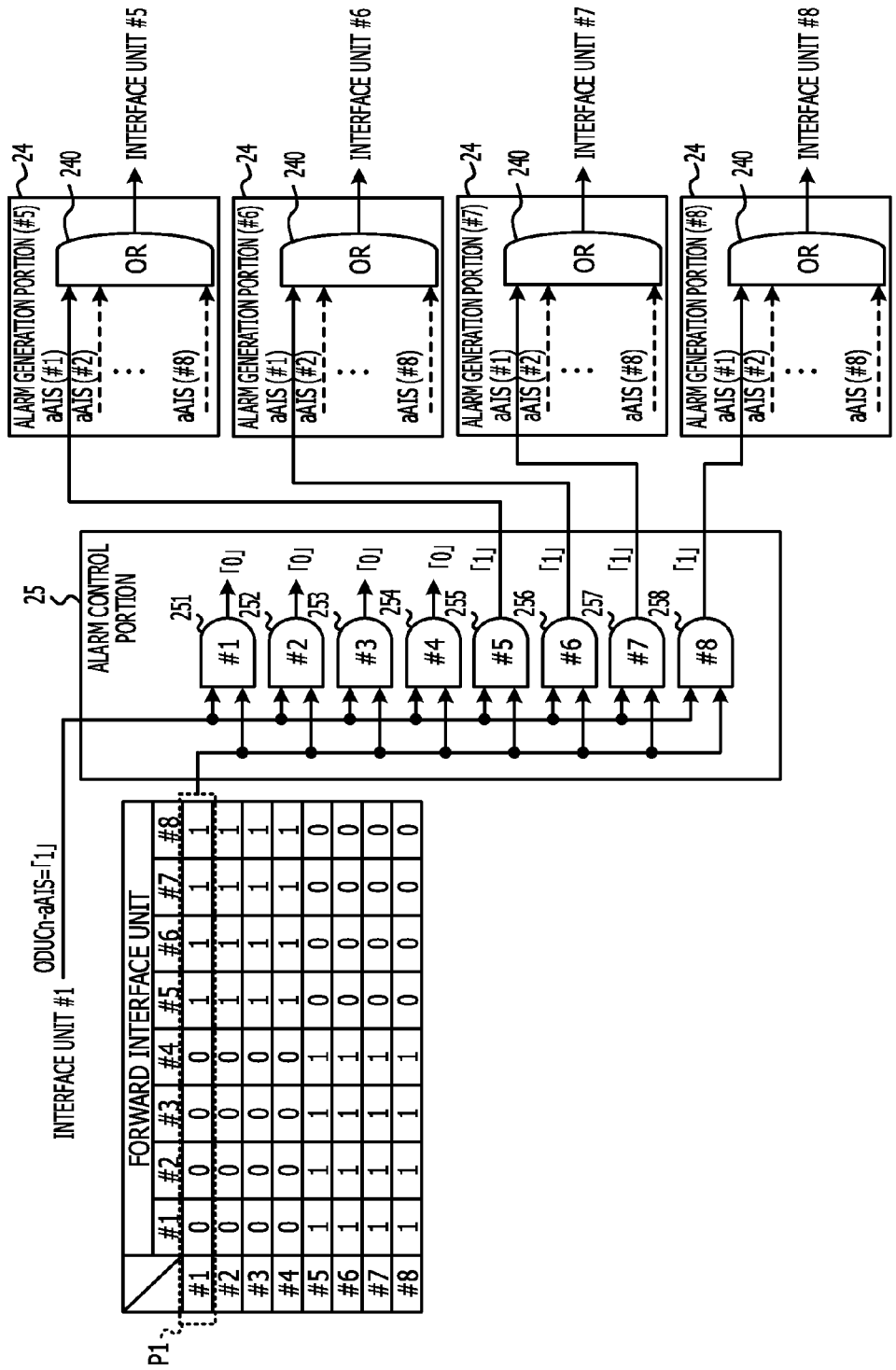
FIG. 8 illustrates one example of an alarm control portion and an alarm generation portion.

FIG. 8 illustrates one example of an alarm control portion and an alarm generation portion. FIG. 8 illustrates configuration of the alarm control portion 25 and the alarm generation portions 24 related to the first behavior example. A case is illustrated when an alarm ODUCn-aAIS to be a factor of AIS is detected in the alarm detecting portion 12 of the interface unit (#1) 1.

The alarm control portion 25 has AND gates 251 through 258 corresponding to the respective interface units (#1 through #8) 1. To one of input terminals of the AND gates 251 through 258, the ODUCn-aAIS (="1") in the alarm detection information is input. Although the AND gates 251 through 258 are equipped similarly for the other alarms in the alarm detection information, descriptions may be given only to the configuration for ODUCn-aAIS.

To the other input terminal of the AND gates 251 through 258, values in the column of the forward interface units (#1 through #8) 1 corresponding to the interface unit (#1) 1 in the forward table (refer to FIG. 6A) are input respectively. For example, "0" is input to the other input terminal of the AND gates 251 through 254, and "1" is input to the other input terminal of the AND gates 255 through 258.

Therefore, as a result of logical operation, the AND gates 251 through 254 output "0" and the AND gates 255 through 258 output "1". The AND gates 251 through 258 output the logical operation values respectively to the alarm generation portions 24 of the interface units (#1 through #8) 1. FIG. 8 illustrates the alarm generation portions 24 of the interface units (#5 through #8) 1 having the logical operation values corresponding to "1".

The alarm generation portion 24 has an OR gate 240 having input terminals (refer to "aAIS (#1)" through "aAIS (#8)") corresponding to the respective interface units (#1 through #8) 1. As a logical operation value "1" is input to at least one of the input terminals "aAIS (#1)" through "aAIS (#8)", the OR gate 240 outputs the alarm detection information to the interface unit 1.

Since the alarm is detected in the interface unit (#1) 1, the logical operation values of the AND gates 251 through 258 are input to the input terminal "aAIS (#1)" of the OR gate 240 of the alarm generation portion 24. The logical operation values related to the AIS of the other interface units (#2 through #8) 1 are input to the input terminals "aAIS (#2)" through "aAIS (#8)" of the OR gate 240.

Since the AND gates 255 through 258 output "1", the OR gates 240 of the alarm generation portions 24 corresponding to the interface units (#5 through #8) 1 output the alarm detection information respectively to the interface units (#5 through #8) 1. Thus, an alarm of each frame signal that belongs to the group G of the frame signal in which the alarm is detected is generated to be forwarded by the AIS.

Since the AND gates 251 through 254 output "1", the OR gates 240 of the alarm generation portions 24 corresponding to the interface units (#1 through #4) 1 do not output alarm detection information to the interface units (#1 through #4) 1. Therefore, the interface units (#1 through #4) 1 do not transmit AIS. Although the AND gates 251 through 254 for AIS are illustrated, the alarm generation portions 24 are equipped similarly with AND gates for BDI.

When generation process and forwarding process of an alarm is carried out by hardware, such as the AND gates 251 through 258 and the OR gates 240, the time may be reduced in comparison with processing by software.

FIG. 7 and FIG. 8 illustrate behaviors when an alarm to be a factor of AIS is detected. When an alarm to be a factor of BDI is detected, substantially similar behaviors in which only tables of the group information 31a referred by the alarm control portion 25 are different may also be carried out.

Figure 9:
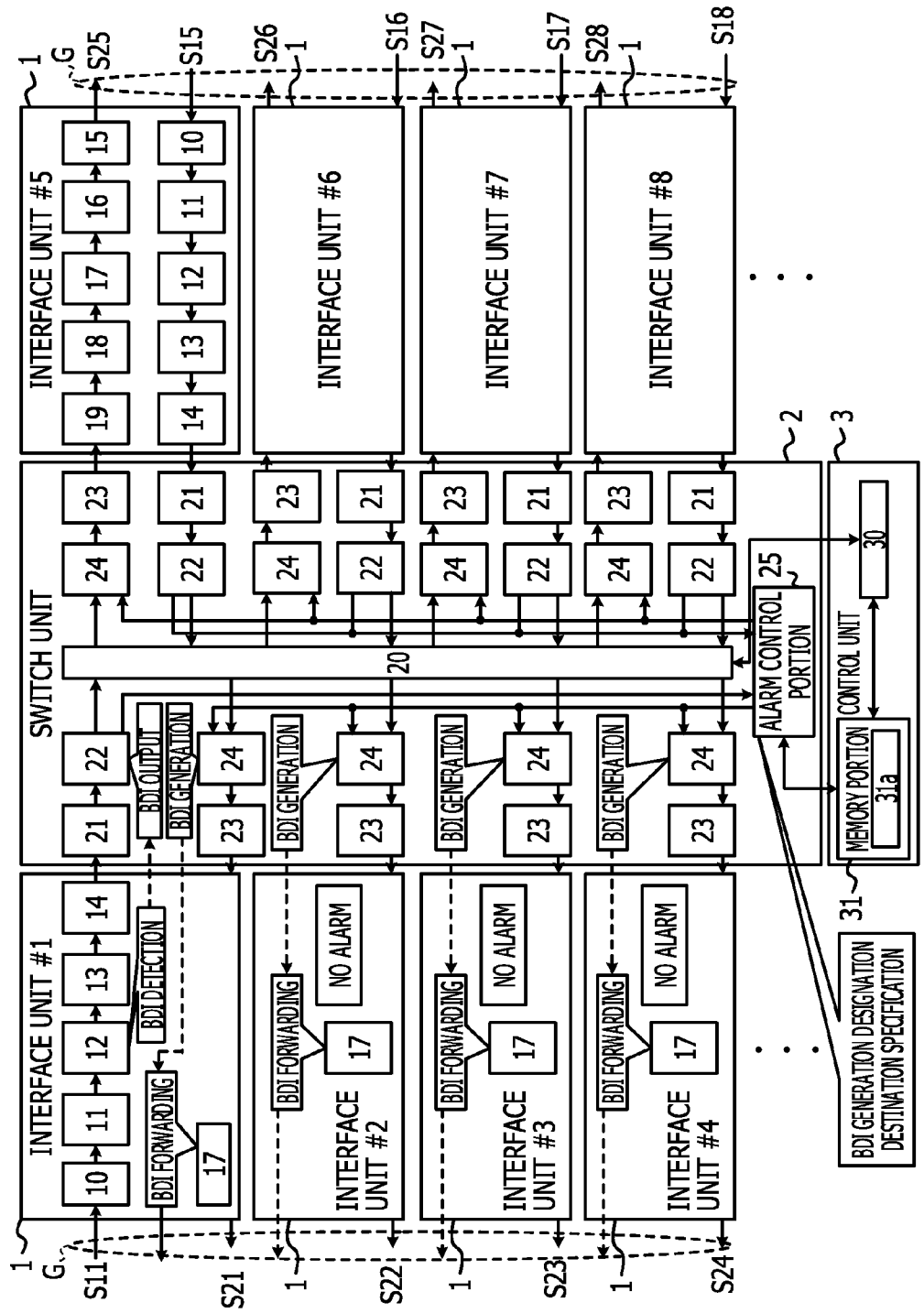
FIG. 9 illustrates one example of a second behavior of a transmission device.

FIG. 9 illustrates one example of a second behavior of a transmission device. In FIG. 9, identical reference characters are given to substantially the same or similar configuration to FIG. 2 and the descriptions may be omitted or reduced.

The alarm detecting portion 12 of the interface unit (#1) 1 detects an alarm to be a factor of BDI (refer to "BDI detection"). At this time, no alarm is detected in the other interface units (#2 through #4) 1 of the identical group G (refer to "no alarm"). The detected alarm is notified to the alarm output portion 22 corresponding to the interface units (#1) 1 by the alarm detection information (refer to broken lines). Then, the alarm output portion 22 outputs the alarm detection information indicating occurrence of an alarm to the alarm control portion 25 (refer to "BDI output").

The alarm control portion 25 specifies the alarm generation portion 24 to be instructed to generate an alarm from the identification number #1 of the interface unit 1 in which the alarm is detected by referring to the group information 31a (refer to "BDI generation designation destination specification"). Since the alarm generation portions 24 corresponding to the interface units (#1 through #4) 1 become targets (refer to reference characters P2 in FIG. 6B), the alarm control portion 25 instructs each of the alarm generation portions 24 to generate the alarm.

The alarm generation portions 24 corresponding to the interface units (#1 through #4) 1 generate the alarm (refer to "BDI generation"). For example, the alarm generation portions 24 generate alarm detection information that notifies of detection of the alarm. The generated alarm detection information is output to the alarm forwarding portion 17 of the interface units (#1 through #4) 1 (refer to broken lines). The alarm forwarding portion 17 carries out forwarding process of an alarm, for example, generation process of BDI (refer to "BDI forwarding"). The BDI is transmitted to another transmission device in the backward direction.

Figure 10:
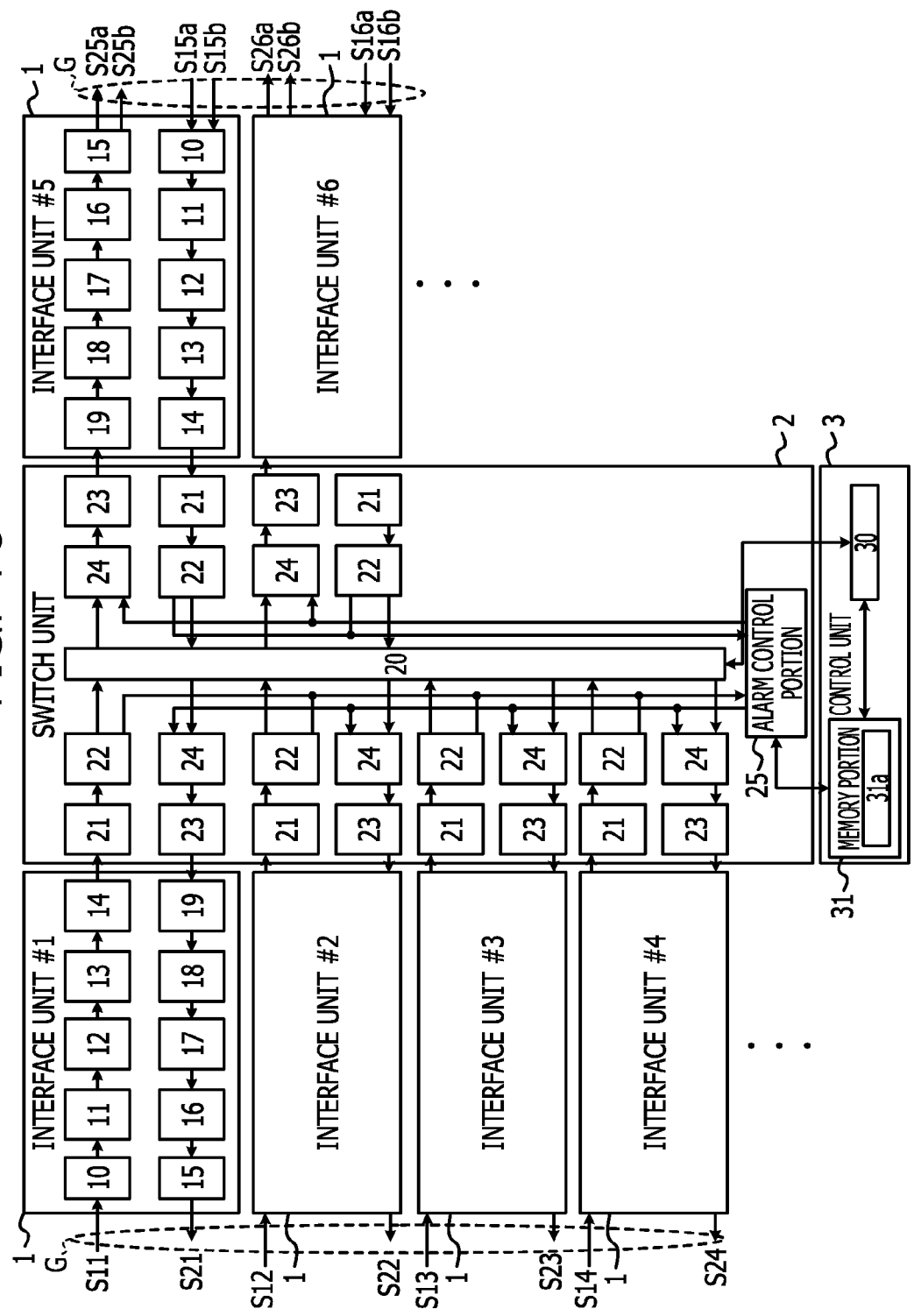
FIG. 10 illustrates one example of functional configuration of an interface unit and a switch unit.

FIG. 10 illustrates one example of functional configuration of an interface unit and a switch unit. In FIG. 10, identical reference characters are given to substantially the same or similar configuration to FIG. 2 and the descriptions may be omitted or reduced.

The transmission device illustrated in FIG. 2 carries out multicarrier transmission at 400 Gbps using the eight interface units (#1 through #8) 1 having transmission capacity of 100 Gbps. The transmission device illustrated in FIG. 10 uses four interface units (#1 through #4) 1 having transmission capacity of 100 Gbps and two interface units (#5, #6) 1 having transmission capacity of 200 Gbps. Therefore, multicarrier transmission at 400 Gbps is carried out.

The interface units (#1 through #4) 1 modulate frame signals by DP-BPSK whereas the interface units (#5, #6) 1 modulate frame signals by DP-QPSK. According to DP-BPSK, 2-bit data is coded by modulation process in one time. According to DP-QPSK, 4-bit data is coded by modulation process in one time.

Therefore, the transmission capacity of the interface units (#5, #6) 1 is twice the interface units (#1 through #4) 1. The transmitting portions 15 of the interface units (#5, #6) 1 output OTU frames respectively as two optical signals S25a, S25b, S26a, S26b. To the receiving portions 10 of the interface units (#5, #6) 1, respectively two optical signals S15a, S15b, S16a, S16b are input. The functions of the other portions 11 through 14 of the interface units (#5, #6) 1 may be similar to the functions described above.

Since the configuration of the interface units 1 is different from the configuration illustrated in FIG. 2 or FIG. 9, the group information 31*a* may also be different. FIG. 11A illustrates one example of a forward table. FIG. 11B illustrates one example of a backward table.

A method of referring to each table illustrated in FIG. 11A and FIG. 11B is similar to each table illustrated in FIG. 6A and FIG. 6B. For example, when the interface unit (#1) 1 detects an alarm to be a factor of AIS, the interface units (#5, #6) 1 transmit AIS (refer to reference characters P3 in FIG. 11A). For example, when the interface unit (#1) 1 detects an alarm to be a factor of BDI, the interface units (#1 through #4) 1 transmit BDI (refer to reference characters P4 in FIG. 11B).

Figure 12:
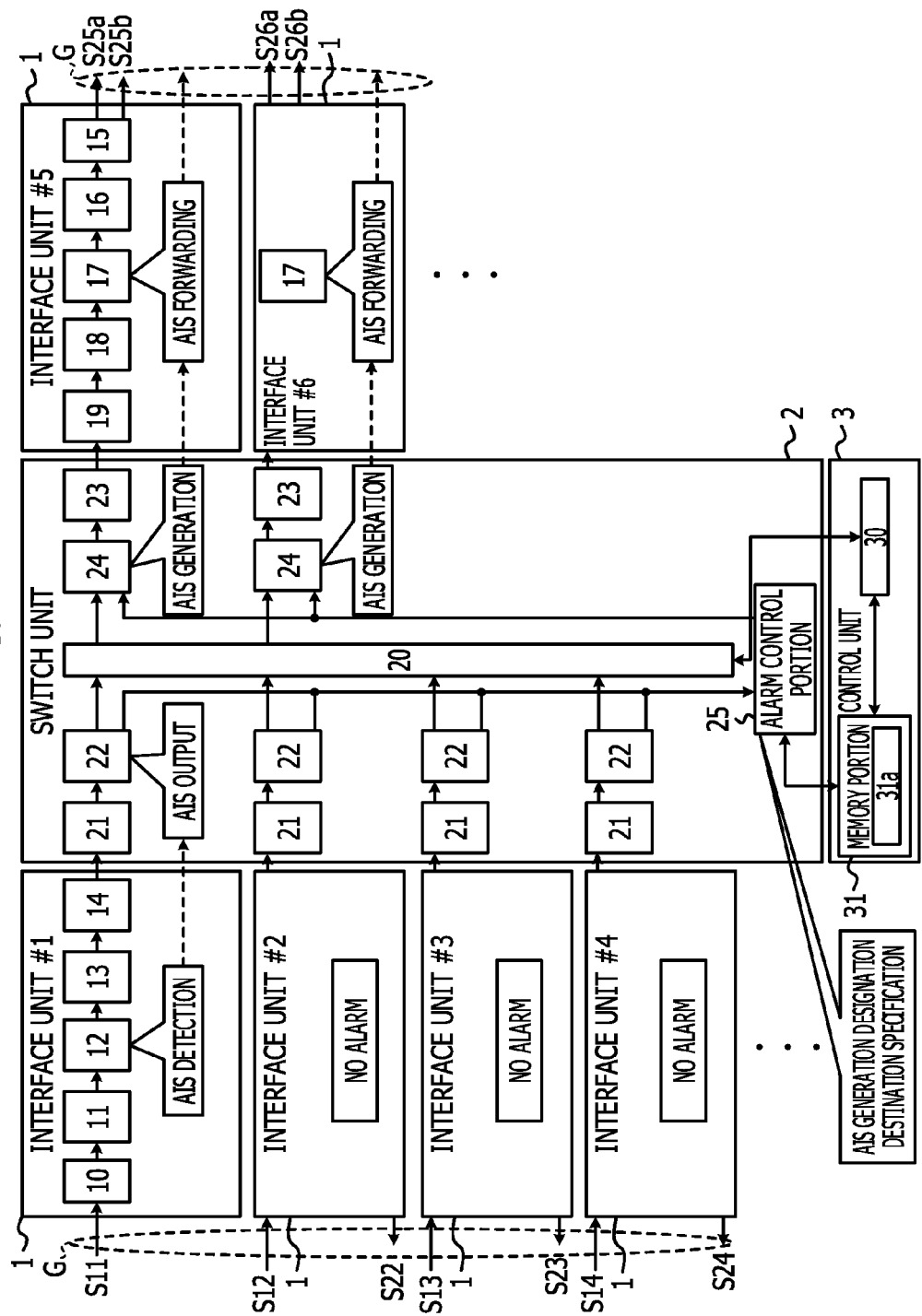
FIG. 12 illustrates one example of a third behavior of a transmission device.

FIG. 12 illustrates one example of a third behavior of a transmission device. In FIG. 12, identical reference characters are given to substantially the same or similar configuration to FIG. 10 and the descriptions may be omitted or reduced.

The alarm detecting portion 12 of the interface unit (#1) 1 detects an alarm to be a factor of AIS (refer to "AIS detection"). At this time, no alarm is detected in the other interface units (#2 through #4) 1 in the identical group G (refer to "no alarm"). The detected alarm is notified to the alarm output portion 22 corresponding to the interface unit (#1) 1 by the alarm detection information (refer to broken lines). Then, the alarm output portion 22 outputs alarm detection information indicating occurrence of the alarm to the alarm control portion 25 (refer to "AIS output").

The alarm control portion 25 specifies the alarm generation portion 24 to be instructed to generate an alarm from the identification number #1 of the interface unit 1 in which the alarm is detected by referring to the group information 31*a* (refer to "AIS generation designation destination specification"). Since the alarm generation portions 24 corresponding to the interface units (#5, #6) 1 become targets (refer to reference characters P3 in FIG. 11A), the alarm control portion 25 instructs each of the alarm generation portions 24 to generate the alarm.

The alarm generation portions 24 corresponding to the interface units (#5, #6) 1 generates an alarm (refer to "AIS generation"). For example, the alarm generation portions 24 generate alarm detection information that notifies of detection of the alarm. The generated alarm detection information is output to the alarm forwarding portions 17 of the interface units (#5, #6) 1 (refer to broken lines). The alarm forwarding portions 17 carry out forwarding process of the alarm, for example, generation process of AIS (refer to "AIS forwarding"). The AIS is transmitted to another transmission device in the forward direction.

Figure 13:
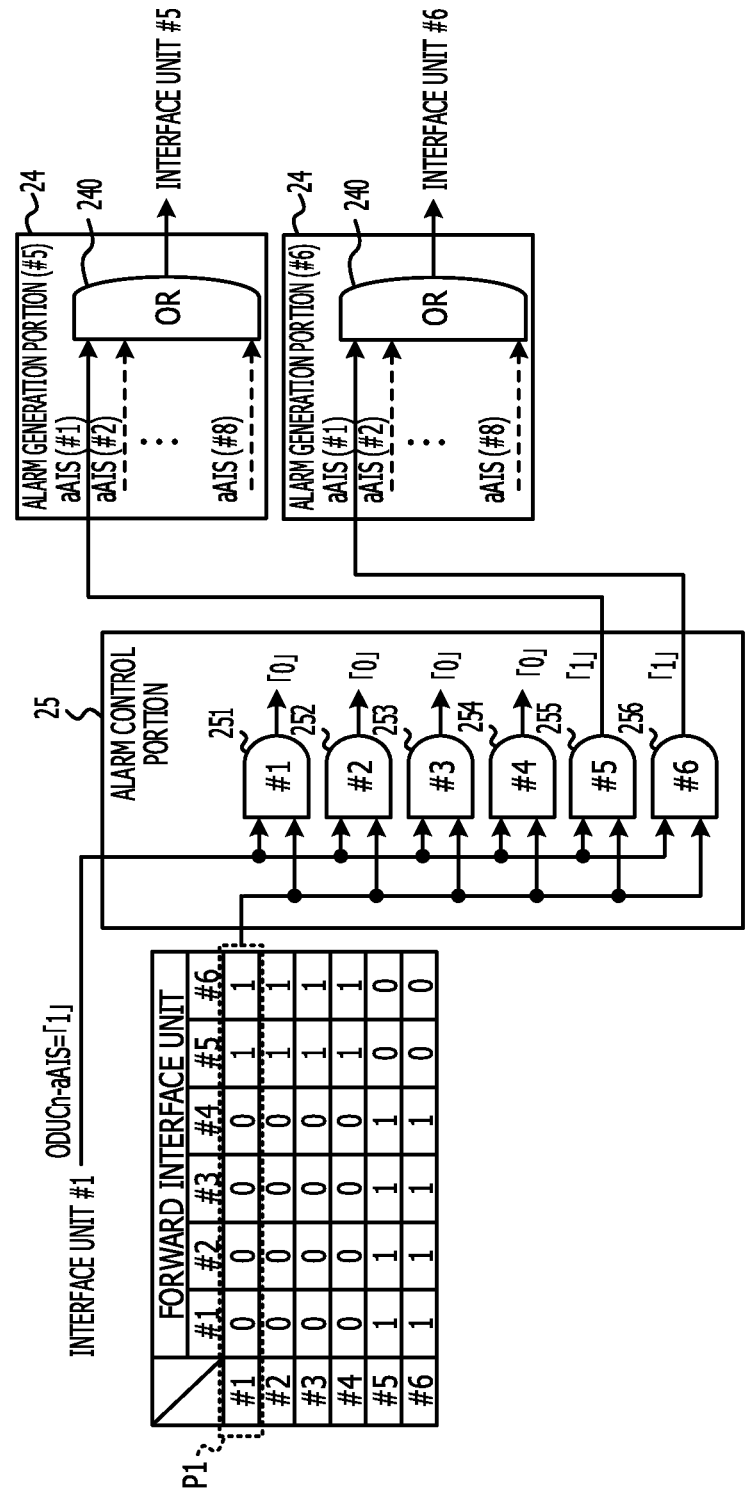
FIG. 13 illustrates one example of an alarm control portion and an alarm generation portion.

FIG. 13 illustrates one example of an alarm control portion and an alarm generation portion. FIG. 13 illustrates configuration of the alarm control portion 25 and the alarm generation portions 24 related to the third behavior. In the alarm detecting portion 12 of the interface unit (#1) 1, an alarm ODUCn-aAIS to be a factor of AIS is detected. In FIG. 13, identical reference characters are given to substantially the same or similar configuration to FIG. 8 and the descriptions may be omitted or reduced.

To one of input terminals of the AND gates 251 through 256, ODUCn-aAIS (="1") in the alarm detection information is input. Based on the forward table (refer to FIG. 11A), "0" is input to the other input terminals of the AND gates 251 through 254 and "1" is input to the other input terminals of the AND gates 255, 256.

As a result of a logical operation, the AND gates 251 through 254 output "0" to the alarm generation portions 24 corresponding to the interface units (#1 through #4) 1. The AND gates 255, 256 output "1" to the alarm generation portions 24 corresponding to the interface units (#5, #6) 1. Therefore, "1" is input to the input terminal "aAIS (#1)" of the OR gates 240 of the respective alarm generation portions 24 corresponding to the interface units (#5, #6) 1.

The OR gates 240 of the alarm generation portions 24 corresponding to the interface units (#5, #6) 1 output the alarm detection information respectively to the interface units (#5, #6) 1. An alarm of each frame signal that belongs to the group G of the frame signal in which the alarm is detected is generated to be forwarded by the AIS.

In the third behavior illustrated in FIG. 12 and FIG. 13, an alarm to be a factor of AIS is detected. When an alarm to be a factor of BDI is detected, substantially similar behaviors in which only tables of the group information 31*a* referred by the alarm control portion 25 are different may also be carried out.

Figure 14:
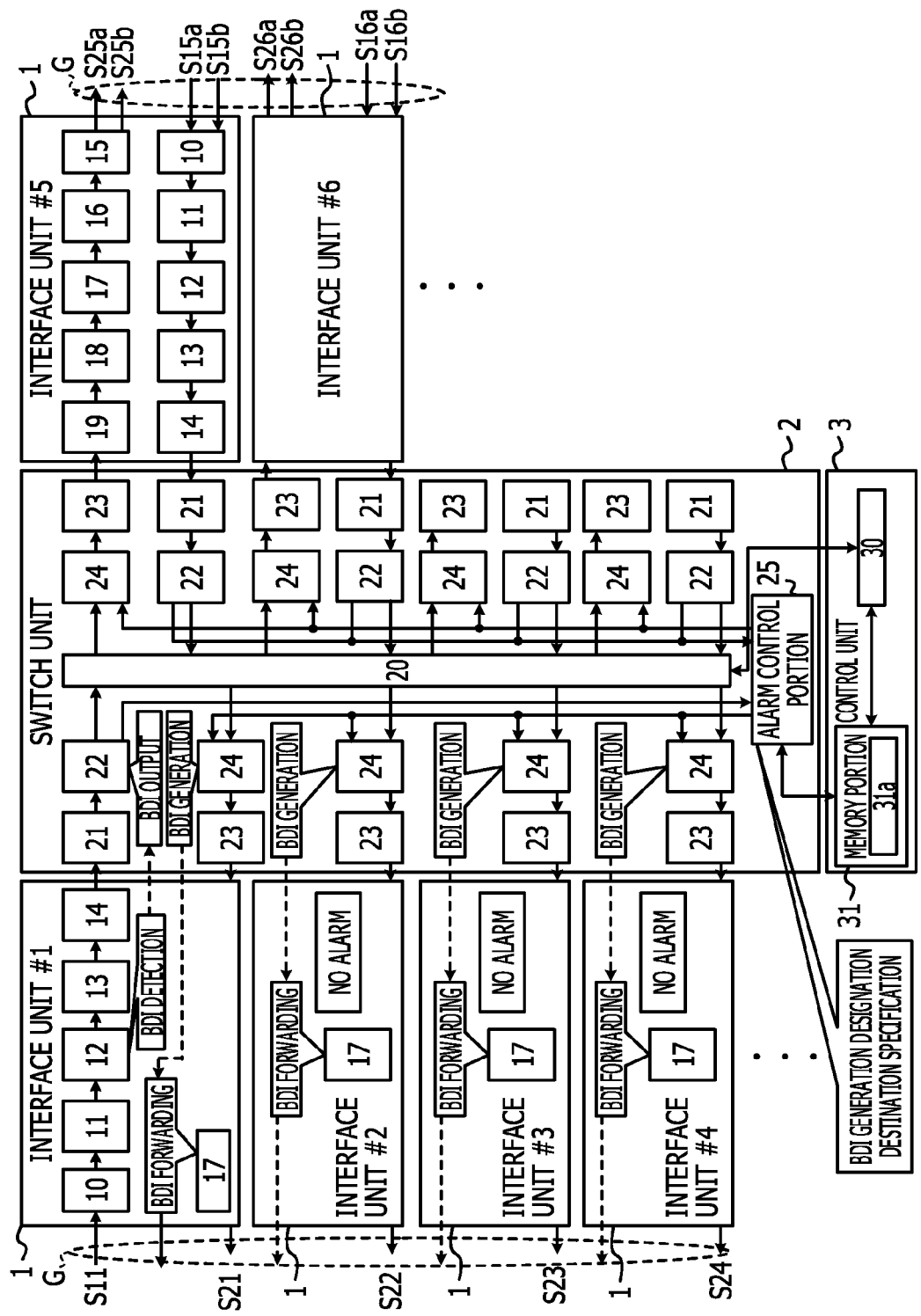
FIG. 14 illustrates one example of a fourth behavior of a transmission device.

FIG. 14 illustrates one example of a fourth behavior of a transmission device. In FIG. 14, identical reference characters are given to substantially the same or similar configuration to FIG. 10 and the descriptions may be omitted or reduced.

The alarm detecting portion 12 of the interface unit (#1) 1 detects an alarm to be a factor of BDI (refer to "BDI detection"). At this time, no alarm is detected in the other interface units (#2 through #4) 1 of the identical group G (refer to "no alarm"). The detected alarm is notified to the alarm output portion 22 corresponding to the interface unit (#1) 1 by the alarm detection information (refer to broken lines). The alarm output portion 22 outputs alarm detection information indicating occurrence of the alarm to the alarm control portion 25 (refer to "BDI output").

The alarm control portion 25 specifies the alarm generation portion 24 to be instructed to generate an alarm from the identification number #1 of the interface unit 1 in which the alarm is detected by referring to the group information 31*a* (refer to "BDI generation designation destination specification"). For example, since the alarm generation portions 24 corresponding to the interface units (#1 through #4) 1 become targets (refer to reference characters P4 in FIG. 11B), the alarm control portion 25 instructs each of the alarm generation portions 24 to generate the alarm.

The alarm generation portions 24 corresponding to the interface units (#1 through #4) 1 generate the alarm (refer to "BDI generation"). For example, the alarm generation portions 24 generate alarm detection information that notifies of detection of the alarm. The generated alarm detection information is output to the alarm forwarding portion 17 of the interface units (#1 through #4) 1 (refer to broken lines). The alarm forwarding portion 17 carries out forwarding process of the alarm, for example, generation process of BDI (refer to "BDI forwarding"). The BDI is transmitted to another transmission device in the backward direction.

The transmission device has a plurality of detecting portions (alarm detecting portions) 12, a memory portion 31, a specifying portion (alarm control portion) 25, and one or more generation portions (alarm generation portions) 24. The plurality of detecting portions 12 respectively detect alarms of a plurality of frame signals (OTU frames) in which divided client signals are stored, respectively.

The memory portion 31 stores group information 31*a* indicating the group G having a client signal in common stored therein regarding the plurality of frame signals. The specifying portion 25 specifies another frame signal to store a client signal in common with the frame signal in which the alarm is detected among the plurality of frame signals based on the group information 31a. The one or more generation portions 24 generate an alarm of the other frame signal specified by the specifying portion 25.

When the detecting portion 12 detects an alarm of the frame signal, the specifying portion 25 specifies the other frame signal that belongs to the group G having the client signal stored therein in common with the frame signal. The generation portion 24 generates an alarm of the other frame signal specified by the specifying portion 25.

When an alarm is detected in one of the frame signals to store a client signal in common, the transmission device issues an alarm to another frame signal, so that the alarm detection function may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
    a plurality of detectors configured to respectively detect alarms of a plurality of frame signals having divided client signals respectively;
    a memory configured to store group information indicating a group in which the client signal is in common regarding the plurality of frame signals;
    a specifying portion configured to specify, based on the group information, a second frame signal storing the client signal in common with a first frame signal in which a first alarm is detected by one of the plurality of detectors among the plurality of frame signals; and
    one or more generators configured to generate a second alarm for the second frame signal.

2. The transmission device according to claim 1, further comprising:
    a plurality of forwarding process portions configured to forward the first alarm or the second alarm to another device.

3. The transmission device according to claim 1, wherein the group information includes a forwarding process portion to forward the second alarm or a third alarm for a third frame signal that belongs to the group of the first frame signal among the plurality of frame signals.

4. The transmission device according to claim 2, wherein the forwarding process portion is provided corresponding to each of the plurality of detectors.

5. The transmission device according to claim 4, wherein the group information includes correspondence relationship between identification information of the plurality of detectors and identification information of the forwarding process portion.

6. The transmission device according to claim 3, wherein the specifying portion instructs the one or more generators to generate the second alarm in accordance with the forwarding process portion indicated by the group information, and
    the one or more generators generate the second alarm in accordance with an instruction.

7. A method of controlling a transmission device, comprising:
    detecting, by a plurality of detectors, respectively alarms of a plurality of frame signals having divided client signals respectively;
    specifying a second frame signal to store the client signal in common with a first frame signal in which a first alarm is detected among the plurality of frame signals based on group information in a memory indicating a group in which the client signal is in common regarding the plurality of frame signals; and
    generating a second alarm for the second frame signal.

8. The method according to claim 7, further comprising:
    forwarding the first alarm or the second alarm to another device.

9. The method according to claim 7, wherein the group information includes a forwarding process portion to forward the second alarm or a third alarm for a third frame signal that belongs to the group of the first frame signal among the plurality of frame signals.

10. The method according to claim 7, wherein the forwarding process portion is provided corresponding to each of the plurality of detectors.

11. The method according to claim 10, wherein the group information includes correspondence relationship between identification information of the plurality of detectors and identification information of the forwarding process portion.

12. The method according to claim 9, further comprising:
    issuing an instruction to generate the second alarm in accordance with the forwarding process portion indicated by the group information; and
    generating the second alarm in accordance with the instruction.

* * * * *